US010769462B2

(12) United States Patent
Chiba

(10) Patent No.: US 10,769,462 B2
(45) Date of Patent: Sep. 8, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Shoko Chiba, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 166 days.

(21) Appl. No.: 16/101,531

(22) Filed: Aug. 13, 2018

(65) Prior Publication Data
US 2019/0251377 A1 Aug. 15, 2019

(30) Foreign Application Priority Data
Feb. 15, 2018 (JP) .................................. 2018-024877

(51) Int. Cl.
*G06K 9/00* (2006.01)
*H04N 7/15* (2006.01)
*H04N 7/14* (2006.01)

(52) U.S. Cl.
CPC ..... *G06K 9/00885* (2013.01); *G06K 9/00369* (2013.01); *H04N 7/147* (2013.01); *H04N 7/15* (2013.01)

(58) Field of Classification Search
CPC ........ H04N 7/15; H04N 7/147; H04L 65/403; H04L 63/0861; H04L 12/1818; G06K 9/00369; G06K 9/00885
USPC ................................. 382/115, 117, 118, 124
See application file for complete search history.

(56) References Cited

U.S. PATENT DOCUMENTS 9,100,540 B1 * 8/2015 Gates ....................... H04N 7/15
9,646,198 B2 * 5/2017 Cunico .................. H04N 7/147

FOREIGN PATENT DOCUMENTS

JP 2016-091490 5/2016
JP 2016-094910 5/2016

OTHER PUBLICATIONS

Hosoda, et al. (Conference State Estimation by Biosignal-Observation of Heart Rate Resonance), pp. 1187-1190. (Year: 2004).*

* cited by examiner

*Primary Examiner* — Daniel G Mariam
(74) *Attorney, Agent, or Firm* — Volpe and Koenig, P.C.

(57) ABSTRACT

An information processing apparatus includes a position specifying unit that specifies a position of each member of an assembly, a biometric information acquiring unit that acquires biometric information from members of which the number is smaller than the number of all members, an activeness degree specifying unit that specifies, from the biometric information acquired by the biometric information acquiring unit, an activeness degree of the member from which the biometric information is acquired by the biometric information acquiring unit, and specifies, from the activeness degree and the position specified by the position specifying unit, an activeness degree of a member other than the member from which the biometric information is acquired by the biometric information acquiring unit among the members, and a determination unit that determines a state of the assembly from the activeness degree specified by the activeness degree specifying unit.

7 Claims, 3 Drawing Sheets

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-024877 filed Feb. 15, 2018.

BACKGROUND

(i) Technical Field

The present invention relates to an information processing apparatus and a non-transitory computer readable medium storing a program.

(ii) Related Art

For example, a conference system disclosed in JP2016-91490A is an invention that improves the productivity of the whole conference. This conference system acquires biometric information from all members of the conference and acquires a communication degree, a concentration degree, and a relaxation degree for each member from the acquired biometric information. The productivity, the concentration degree, and the relaxation degree of the whole conference are calculated from the communication degree, the concentration degree, and the relaxation degree for each member. Depending on the result of calculation, the members of the conference are stimulated, and the productivity of the conference is improved.

SUMMARY

It is difficult to acquire biometric information of all members in a case where there is a member who does not want biometric information to be acquired by the system among the members included in an assembly, so that it is difficult to obtain a state of a conference. In addition, it is difficult to obtain the state of the conference by acquiring biometric information from all members, in a case where there is a member who has difficulty in attaching a sensor for acquiring biometric information among the members included in the assembly.

Aspects of non-limiting embodiments of the present disclosure relate to an information processing apparatus and a non-transitory computer readable medium storing a program capable of evaluating the state of an assembly without biometric information of all members of the assembly.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including a position specifying unit that specifies a position of each member of an assembly, a biometric information acquiring unit that acquires biometric information from members of which the number is smaller than the number of all members, an activeness degree specifying unit that specifies, from the biometric information acquired by the biometric information acquiring unit, an activeness degree of the member from which the biometric information is acquired by the biometric information acquiring unit, and specifies, from the activeness degree and the position specified by the position specifying unit, an activeness degree of a member other than the member from which the biometric information is acquired by the biometric information acquiring unit among the members, and a determination unit that determines a state of the assembly from the activeness degree specified by the activeness degree specifying unit.

BRIEF DESCRIPTION OF THE DRAWINGS

Exemplary embodiment(s) of the present invention will be described in detail based on the following figures, wherein.

DETAILED DESCRIPTION

Exemplary Embodiment

Figure 1:
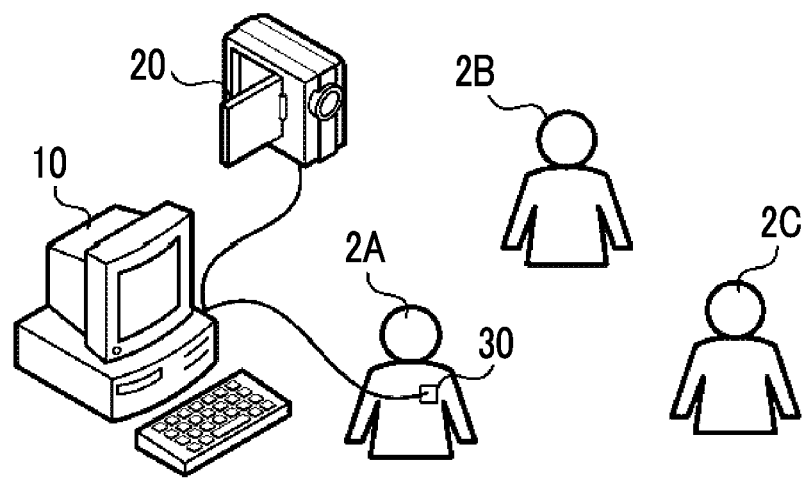
FIG. 1 is a diagram illustrating one example of a scene of use of an information processing apparatus 10 according to one exemplary embodiment of the invention.

FIG. 1 is a diagram illustrating one example of a scene of use of an information processing apparatus 10 according to an exemplary embodiment of the invention. The information processing apparatus 10 is an apparatus that determines the state of a conference held by multiple members 2A to 2C. The members 2A to 2C of the conference are one example of an assembly according to the exemplary embodiment of the invention. Each of the members 2A to 2C is one example of a member of the assembly according to the exemplary embodiment of the invention. The information processing apparatus 10 is a so-called desktop computer apparatus and, in the present exemplary embodiment, determines whether or not the conference is active as the state of the conference. The information processing apparatus 10 is not limited to a desktop apparatus and may be a portable apparatus such as a laptop apparatus, a smartphone, or a tablet terminal. The information processing apparatus 10 acquires a video in which the members 2A to 2C are captured, from a video camera 20 that captures the members 2A to 2C. In addition, the information processing apparatus 10 acquires biometric information of the member 2A using a sensor 30 that is mounted on the member 2A. The information processing apparatus 10 determines the state of the conference held by the members 2A to 2C using the acquired biometric information and the video.

For example, the video camera 20 is installed on the ceiling of a conference room and captures the members 2A to 2C from above the heads of the members 2A to 2C. The video camera 20 captures the members 2A to 2C of the conference and outputs a video signal that represents the video acquired by capturing. The position where the video camera 20 is installed is not limited to the ceiling and may be a position other than the ceiling in a case where all members of the conference may be captured. In addition, the number of video cameras 20 may be more than one. The sensor 30 is a sensor for measuring the heartbeat of a member of a conference and, for example, is mounted on a chest part of the member. The sensor 30 outputs an electric signal that corresponds to the heartbeat. The sensor 30 may not be mounted on the member 2A and may be mounted on the member 2B or the member 2C.

Figure 2:
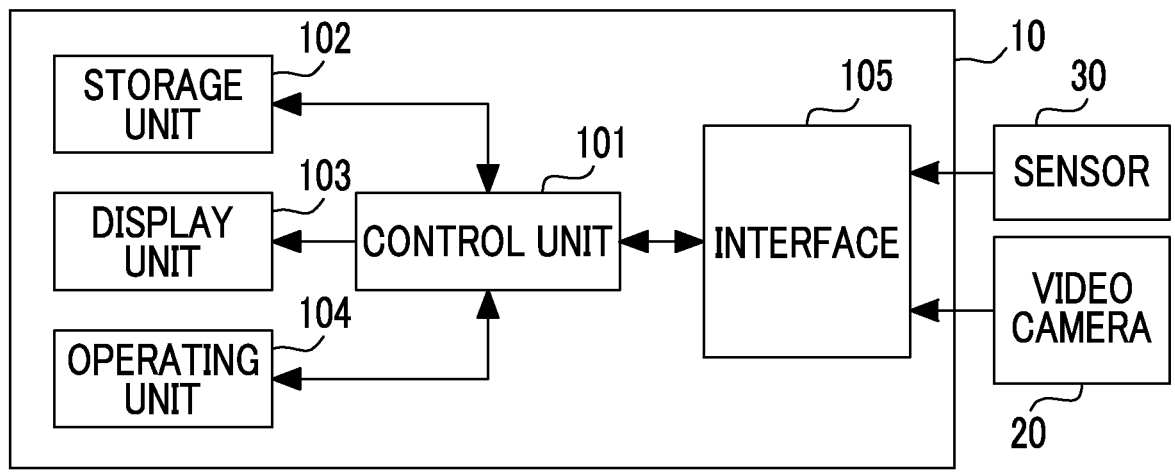
FIG. 2 is a diagram illustrating one example of a hardware configuration of the information processing apparatus 10.

FIG. 2 is a diagram illustrating one example of a part according to the exemplary embodiment of the invention in a hardware configuration of the information processing apparatus 10. An operating unit 104 includes an input device such as a keyboard or a mouse that receives input from an operator. A display unit 103 includes a display device and displays a text, a graphical user interface (GUI), an image, and the like. An interface 105 is hardware that acquires a signal output from an external device. The interface 105 is connected to the sensor 30 and acquires the electric signal output from the sensor 30. In addition, the interface 105 is connected to the video camera 20 and acquires the video signal output from the video camera 20.

A storage unit 102 is a computer readable recording medium and, for example, is configured with a hard disk drive. The storage unit 102 stores a program that is executed by the control unit 101 in order to perform a process of determining the state of the conference. In addition, the storage unit 102 stores a signal or information that is used in order to determine the state of the conference. The storage unit 102 may be configured with at least one of an optical disc, a flexible disk, a magneto-optical disc, a smart card, a flash memory, a magnetic strip, or the like.

The control unit 101 includes a central processing unit (CPU) and a memory. The memory is a computer readable recording medium and is, for example, a random access memory (RAM). Functions implemented in the information processing apparatus 10 are implemented such that the program stored in the storage unit 102 is read into hardware such as the CPU, the memory, and the like, and the CPU operates and controls the storage unit 102, the display unit 103, and the interface 105 and controls reading and/or writing of information and a signal in the memory and the storage unit 102.

Figure 3:
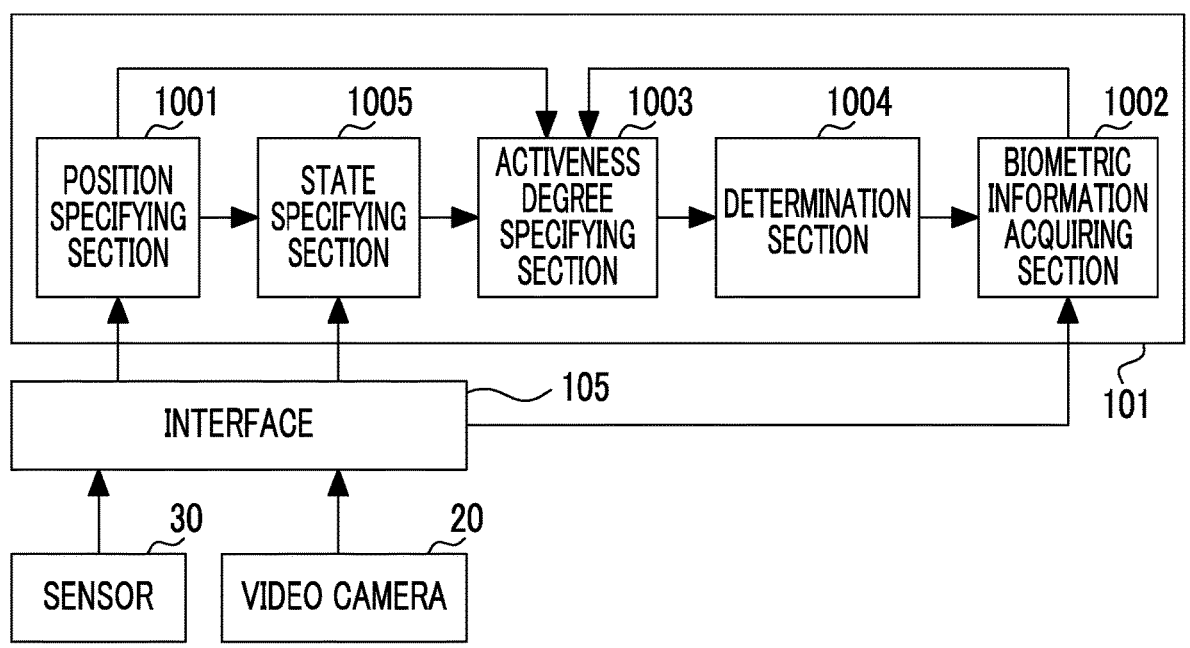
FIG. 3 is a function block diagram illustrating functional configurations implemented by a control unit 101 executing a program.

FIG. 3 is a block diagram illustrating functional configurations implemented by the control unit 101 executing the program.

A position specifying section 1001 acquires the video signal that is supplied to the interface 105 from the video camera 20. The position specifying section 1001 analyzes the acquired video signal and specifies the position of each member of the assembly captured in the video represented by the video signal. In the present exemplary embodiment, the position specifying section 1001 specifies the position of each member of the conference. The position specifying section 1001 is one example of a position specifying unit according to the exemplary embodiment of the invention.

A biometric information acquiring section 1002 acquires the electric signal (biometric information) that is supplied to the interface 105 from the sensor 30. The biometric information acquiring section 1002 is one example of a biometric information acquiring unit according to the exemplary embodiment of the invention.

An activeness degree specifying section 1003 specifies an activeness degree of the member from which the biometric information is acquired, using the biometric information acquired by the biometric information acquiring section 1002. In addition, from the activeness degree of the member from which the biometric information is acquired, and the positions specified by the position specifying section 1001, the activeness degree specifying section 1003 specifies the activeness degree of a member other than the member from which the biometric information is acquired. The activeness degree specifying section 1003 is one example of an activeness degree specifying unit according to the exemplary embodiment of the invention.

A determination section 1004 determines the state of the assembly from the activeness degrees specified by the activeness degree specifying section 1003. The determination section 1004 is one example of a determination unit according to the exemplary embodiment of the invention.

A state specifying section 1005 analyzes the video signal acquired from the interface 105 and specifies the state of each member of the conference. The state specifying section 1005 is one example of a state specifying unit according to the exemplary embodiment of the invention. The state specified by the state specifying section 1005 is, for example, the attitude of each member or the direction of the face of each member captured in the video. In addition, the state specifying section 1005 specifies a group among the members from the position of each member specified by the position specifying section 1001 and the direction of the face of each member specified by the state specifying section 1005.

Figure 4:
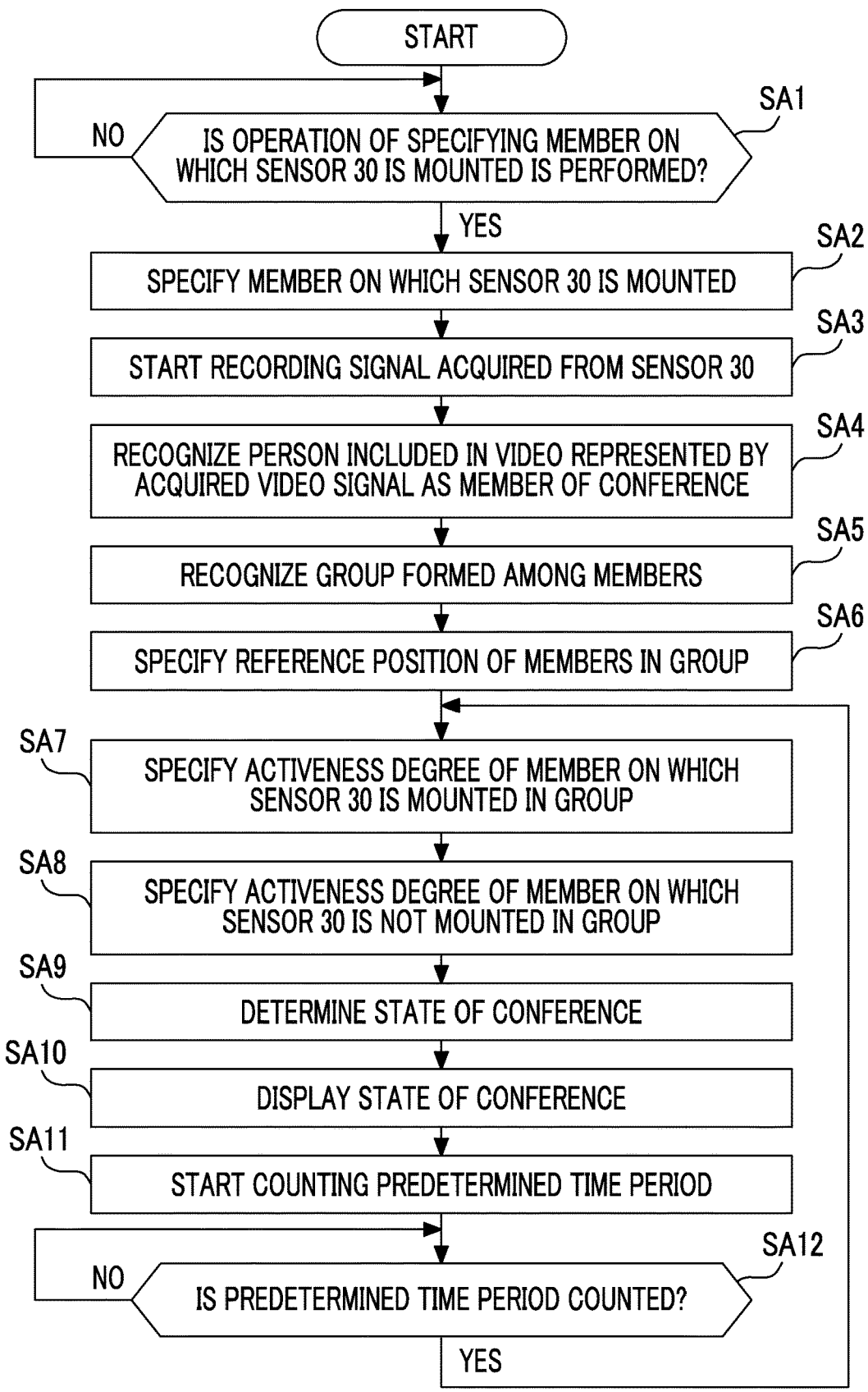
FIG. 4 is a flowchart illustrating a flow of process performed by the control unit 101.

Next, an operating example of the information processing apparatus 10 will be described. FIG. 4 is a flowchart illustrating a flow of process performed by the control unit 101. First, before the conference is started, the sensor 30 is mounted on the member 2A, and the video camera 20 starts capturing the members 2A to 2C. The interface 105 acquires the electric signal output from the sensor 30, and acquires the video signal output from the video camera 20.

The information processing apparatus 10 displays the video represented by the video signal, which is acquired from the video camera 20, on the display unit 103. The video displayed on the display unit 103 includes the members 2A to 2C. A user of the information processing apparatus 10 operates the operating unit 104 and specifies the member on which the sensor 30 is mounted among the displayed members. In a case where an operation of specifying the member on which the sensor 30 is mounted is performed (YES in step SA1), the control unit 101 recognizes a person who is captured at a clicked position, and specifies the recognized person as the member on which the sensor 30 is mounted (step SA2).

Next, in a case where an operation of providing an instruction to start determining the state of the conference is performed in the operating unit 104, the control unit 101 (biometric information acquiring section 1002) starts recording the electric signal, which is acquired by the interface 105 from the sensor 30, in the storage unit 102 (step SA3). In addition, in a case where the operation of providing an instruction to start determining the state of the conference is performed in the operating unit 104, the control unit 101 analyzes the video signal, which is acquired by the interface 105, and recognizes a person included in the video represented by the video signal as a member of the conference (step SA4).

The control unit 101 (state specifying section 1005) recognizes people captured in the video represented by the video signal, and recognizes a group formed among the recognized members (step SA5). For example, the control unit 101 recognizes, as being in the same group, a member for which a state where the distance between the members is within a predetermined range, and a degree to which the directions of the faces of the members are opposite to each other is greater than or equal to a predetermined threshold continues. For the members 2A to 2C, the control unit 101 recognizes the members 2A to 2C as one group in a case where the distance between each member is within the predetermined range, and a degree to which the directions of the faces of the members are opposite to each other is greater than or equal to the predetermined threshold continues. Two or more groups may be recognized.

The control unit 101 specifies a reference position that is a reference of the positions of the members 2A to 2C in the recognized group (step SA6). The control unit 101 (position specifying section 1001) recognizes people captured in the video represented by the video signal, and specifies the horizontal positions of the heads of the recognized people. Next, the control unit 101 (state specifying section 1005) specifies the position of the circumcenter of a triangle connecting the specified positions of the heads of the members 2A to 2C, and sets the specified position of the circumcenter as the reference position of the members 2A to 2C in the group. In a case where the number of members of the conference is two, the control unit 101 may set a position in the middle of the positions of two people as the reference position. In addition, in a case where the number of recognized groups is two or more, the control unit 101 specifies the reference position of the members forming a group for each group.

The control unit 101 (activeness degree specifying section 1003) that specifies the reference position specifies the activeness degree of the member on which the sensor 30 is mounted in the specified group (step SA7). The control unit 101 obtains an RR interval in an electrocardiogram by analyzing the electric signal which is acquired from the sensor 30 and recorded in the storage unit 102, and acquires time series data of fluctuations in heartbeat. The control unit 101 calculates power spectral density from the time series data of fluctuations in heartbeat using frequency analysis, and extracts a high frequency fluctuation component (HF component) corresponding to a respiratory variation and a low frequency component (LF component) corresponding to a Mayer wave which is a fluctuation in blood pressure. The control unit 101 specifies the magnitude of the LF component from a cumulative value of the LF component of the power spectral density, specifies the magnitude of the HF component from a cumulative value of the HF component of the power spectral density, and obtains the ratio (LF/HF) of the LF component to the HF component. LF/HF is an indicator of balance between a sympathetic nervous system and a parasympathetic nervous system. A higher value of LF/HF represents a state where the sympathetic nervous system is dominant and active, and a lower value of LF/HF represents a state where the parasympathetic nervous system is dominant and relaxed. In the present exemplary embodiment, TotalPower that is a value acquired by adding LF/HF and HF is set as the activeness degree.

Next, the control unit 101 (activeness degree specifying section 1003) specifies the activeness degree of the member on which the sensor 30 is not mounted in the group (step SA8). The control unit 101 specifies the horizontal positions of the members 2A to 2C by analyzing the video signal acquired by the interface 105, and specifies the distance to each member from the reference position specified in step SA6. Next, the control unit 101 calculates the activeness degree of the member on which the sensor 30 is not mounted, using the specified distances and the activeness degree specified in step SA7.

For example, calculation for the member 2B uses Expression (1) below, and calculation for the member 2C uses Expression (2) below.

Activeness degree of member 2B=activeness degree of member 2A×distance to member 2B from reference position/distance to member 2A from reference position  (1)

Activeness degree of member 2C=activeness degree of member 2A×distance to member 2C from reference position/distance to member 2A from reference position  (2)

That is, a higher activeness degree is calculated for the member who is closer to the reference position specified at the time of start of the conference, and a lower activeness degree is calculated for the member who is away from the reference position.

Next, the control unit 101 (determination section 1004) determines the state of the conference using the calculated activeness degree of each member (step SA9). For example, the control unit 101 calculates the average value of the activeness degrees of the members 2A to 2C forming the recognized group. The control unit 101 determines that the conference is in an active state in a case where the calculated average value is greater than or equal to a predetermined first threshold. In addition, the control unit 101 determines that the conference is in an inactive state in a case where the calculated average value is less than a second threshold that is less than the predetermined first threshold. The control unit 101 determines that the state of the conference is a state between the active state and the inactive state in a case where the calculated average value is less than the predetermined first threshold and greater than or equal to the second threshold. In a case where the control unit 101 recognizes multiple groups, the control unit 101 may set the average value of the activeness degrees of the members for each group as the activeness degree of the group, and determine the state of the whole conference by comparing the average value of the activeness degrees of the multiple groups with a threshold. In addition, in a case where there is no member on which the sensor 30 is mounted in the recognized group, the control unit 101 does not calculate the activeness degrees of the members forming the group, and does not use the activeness degree of the group in specifying the state of the conference.

The control unit 101 that determines the state of the conference displays the result of determination of the state of the conference on the display unit 103 (step SA10). Next, the control unit 101 starts counting a predetermined time period (step SA11). While the control unit 101 counts the predetermined time period, the electric signal acquired from the sensor 30 is recorded in the storage unit 102. The control unit 101 determines whether or not the predetermined time period is counted (step SA12) and returns the flow of process to step SA7 in a case where the predetermined time period is counted (YES in step SA12). In the present exemplary embodiment, while the time period to be counted is, for example, 30 seconds, the time period may be less than 30 seconds or may be a time period exceeding 30 seconds. The control unit 101 finishes the execution of the process illustrated in FIG. 4 in a case where an operation of providing an instruction to stop determining the state of the conference is performed in the operating unit 104 while the process illustrated in FIG. 4 is performed.

According to the present exemplary embodiment, the state of the conference may be determined without acquiring the biometric information from all members of the conference.

MODIFICATION EXAMPLE

While the exemplary embodiment of the invention is described thus far, the invention is not limited to the exemplary embodiment and may be embodied in various other forms. For example, the invention may be embodied by modifying the exemplary embodiment as follows. The exemplary embodiment and the modification example below may be combined with each other.

In the invention, in a case where the number of members of the conference is four or more, the control unit 101 may specify the smallest virtual circle that includes all members, and set the center of the specified circle as the reference position. In addition, a method of determining the reference position is not limited to the above method. For example, any method may be set by operating the operating unit 104. In addition, for example, in the case of a conference that is held by projecting materials to a screen using a projector, the control unit 101 may set a position at which the lines of sight of the members converge on the screen as the reference position.

In the invention, for example, the member on which the sensor 30 is mounted in the conference may be a host or a speaker in a case where a host or a speaker is present. In addition, in a conference of a department or a group in a company, the sensor 30 may be mounted on a leader or an executive.

In the invention, the sensor 30 may be a sensor that measures pulses and may be mounted on, for example, the wrist or the ankle of a member. In a case where the sensor 30 measures pulses, the control unit 101 may extract the HF component and the LF component from fluctuations in pulse instead of fluctuations in heartbeat.

In the invention, a sensor for measuring the number of times of respirations may be mounted on a member, and the control unit 101 may perform weighting of the activeness degree using the number of times of respirations measured using the sensor. For example, the control unit 101 may decrease the weight of the activeness degree in a case where the number of times of respirations in a predetermined period is less than a predetermined threshold, and may increase the weight of the activeness degree in a case where the number of times of respirations in the predetermined period is greater than or equal to the predetermined threshold.

In the exemplary embodiment, while the control unit 101 calculates the activeness degrees of all members of the conference, the control unit 101 may not calculate the activeness degrees of all members. For example, the control unit 101 may calculate the activeness degree for the member on which the sensor 30 is mounted, the member of which the distance from the reference position is the shortest, and the member of which the distance from the reference position is the longest, and may not calculate the activeness degree for other members. In addition, in the case of such a configuration, the control unit 101 may determine the state of the conference from the activeness degrees of the member on which the sensor 30 is mounted, the member of which the distance from the reference position is the shortest, and the member of which the distance from the reference position is the longest.

In the invention, a center value may be specified instead of the average value in step SA9, and the state of the conference may be determined by comparing the specified center value with the threshold.

In the invention, the number of members on which the sensor 30 is mounted is not limited to one. The sensor 30 may be mounted on multiple people in a case where the sensor 30 is not mounted on all members. In the case of mounting the sensor 30 on multiple members, for example, the control unit 101 calculates the activeness degree of each member on which the sensor 30 is mounted, and specifies the distance to the reference position from each member on which the sensor 30 is mounted. Next, the control unit 101 calculates the average value of the activeness degrees of the members on which the sensor 30 is mounted, and calculates the average value of the distances to the reference position from the members on which the sensor 30 is mounted. The control unit 101 calculates the activeness degree for a member on which the sensor 30 is not mounted, using the calculated average value. For example, in a case where the sensor 30 is mounted on the member 2A and the member 2B, the activeness degree of the member 2C on which the sensor 30 is not mounted is calculated using Expression (3) below.

Activeness degree of member 2*C*=average value of activeness degree of member 2*A* and activeness degree of member 2*B*×distance to member 2*C* from reference position/average value of distance to member 2*A* from reference position and distance to member 2*B* from reference position (3)

In a case where the sensor 30 is mounted on multiple members, the control unit 101 may specify the center value instead of the average value, and calculate the activeness degree of a member on which the sensor 30 is not mounted, using the specified center value. In addition, in a case where the sensor 30 is mounted on multiple members, the control unit 101 may calculate the activeness degree of a member on which the sensor 30 is not mounted, using the activeness degree of a member, among the members on which the sensor 30 is mounted, who is closest to the member on which the sensor 30 is not mounted. For example, in a case where the sensor 30 is mounted on the member 2A and the member 2B, and the member 2C on which the sensor 30 is not mounted is closer to the member 2B than the member 2A, the activeness degree of the member 2C is calculated using Expression (4) below.

Activeness degree of member 2*C*=activeness degree of member 2*B*×distance to member 2*C* from reference position/distance to member 2*B* from reference position (4)

In the exemplary embodiment, while the control unit 101 recognizes all people included in the video represented by the acquired video signal as members, recognition of members is not limited to the configuration of the exemplary embodiment. For example, the control unit 101 may recognize a person included in the video represented by the video signal after a predetermined time period as a member, and do not recognize a person included in the video for a time period shorter than or equal to the predetermined time period as a member. In addition, in the invention, a member may be specified by operating the operating unit 104 on the video displayed on the display unit 103, and a person other than the specified person may not be recognized as a member. In addition, in the invention, the control unit 101 may analyze the acquired video signal and not recognize a person doing a predetermined motion as a member.

In the invention, the control unit 101 may specify the state of each member by analyzing the acquired video signal. For example, the control unit 101 (state specifying section 1005) specifies whether or not the member is uttering as the state of the member. In this case, the control unit 101 may recognize whether or not each member is uttering by analyzing the acquired video signal, and not calculate the activeness degree of an uttering member. According to the configuration of the present modification example, compared to the amount of calculation in a configuration in which the activeness degree of an uttering member is calculated, the amount of calculation at the time of calculating the activeness degree is decreased, and a load caused by calculation may be decreased.

In addition, the control unit 101 (state specifying section 1005) may specify the attitude of the member as the state of the member. In this case, the control unit 101 recognizes the attitude of each member by analyzing the acquired video signal. In a case where the attitude of the member is inclined forward, the control unit 101 may increase the weight of the activeness degree as the angle of forward inclination is increased. In a case where the attitude of the member is inclined backward, the control unit 101 may decrease the weight of the activeness degree as the angle of backward inclination is increased. According to this configuration, the activeness degree of the member may be complemented, compared to a configuration in which the attitude of the member is not specified. An inclination sensor that measures the inclination of a chair may be disposed in a chair on which the member sits, and the control unit 101 may specify the attitude of the member from the inclination measured by the inclination sensor.

In the exemplary embodiment, while the position of the member is specified by recognizing a person in the video represented by the acquired video signal, the configuration of specifying the position of the member is not limited to the configuration of the exemplary embodiment. For example, the control unit 101 may recognize a predetermined chair on which the member sits in the video represented by the acquired video signal, specify the position of the recognized chair, and set the specified position as the position of the member. In addition, in the invention, a beacon may be installed in the chair on which the member sits, and the control unit 101 may specify the position of the chair using the intensity of an electric wave emitted by the beacon and set the specified position of the chair as the position of the member.

In the invention, the control unit 101 may calculate a correlation coefficient of the activeness degree between two members and display the calculated correlation coefficient on the display unit 103. In addition, in the configuration of calculating the correlation coefficient, the result of calculation may be displayed on the display unit 103 for a combination of members for which the calculated correlation coefficient is greater than or equal to a predetermined threshold.

In the invention, the information processing apparatus 10 may determine the state of the conference in a so-called web conference system in which each member uses a personal computer including a camera and a microphone and hold a conference by transmitting and receiving a video and voice through a communication line. In the case of estimating the state of the conference in the web conference system, the control unit 101 specifies the distance to the camera from each member by analyzing the video captured by the camera of the personal computer used by each member in a case where an operation of providing an instruction to start estimating the state of the conference is performed. The control unit 101 calculates the activeness degree of a member other than the member on which the sensor 30 is mounted, using the activeness degree of the member on which the sensor 30 is mounted, the distance from the member on which the sensor 30 is mounted to the camera capturing the member, and the distance from the member on which the sensor 30 is not mounted to the camera capturing the member. For example, in a case where the sensor 30 is mounted on the member 2A in the web conference, and the activeness degree of the member 2B on which the sensor 30 is not mounted is calculated, the calculation is performed using Expression (5) below.

$$\text{Activeness degree of member } 2B = \text{activeness degree of member } 2A \times \text{distance to member } 2B \text{ from camera capturing member } 2B/\text{distance to member } 2A \text{ from camera capturing member } 2A \quad (5)$$

In the configuration of estimating the state of the conference in the web conference system, the control unit 101 may specify the attitude of each member from the video in which the member is captured, and perform weighting of the activeness degree using the specified attitude.

In the exemplary embodiment, while the information processing apparatus 10 estimates the states of the members of the conference, the information processing apparatus 10 may estimate a state other than the states of the members of the conference. For example, for an assembly of players of a board game, the activeness degree of the game may be obtained in the same manner as the members of the conference, and the state of the game may be estimated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
specify a position of each member of an assembly;
acquire biometric information from members of which the number is smaller than the number of all members;
specify, from the biometric information acquired by the processor, an activeness degree of the member from which the biometric information is acquired by the processor, and specify, from the activeness degree and the position specified by the processor, an activeness degree of a member other than the member from which the biometric information is acquired by the processor among the members; and
determine a state of the assembly from the activeness degree specified by the processor.

2. The information processing apparatus according to claim 1,
wherein the processor is configured to specify the position of the member from a video that is acquired from a capturing unit which captures the member.

3. The information processing apparatus according to claim 2,
wherein the processor is configured to:
set a person captured in the video after a predetermined time period as the member, and
specify the position of the member.

4. The information processing apparatus according to claim 1, wherein the processor is further configured to:
specify a state of the member, and
specify, further using the state specified by the processor, the activeness degree of the member from which the biometric information is acquired by the processor, and specify, further using the state specified by the processor, the activeness degree of the member other than the member from which the biometric information is acquired by the processor among the members.

5. The information processing apparatus according to claim 4,
wherein the processor is further configured to specify: as the state, an attitude of the member specified from a video acquired by a capturing unit which captures the member.

6. The information processing apparatus according to claim 4, wherein the processor is further configured to:
specify whether or not the member utters as the state, and
specify the activeness degree of the member from which the biometric information is acquired by the processor, when the state specified by the processor indicates that uttering is not performed, and specify the activeness degree of the member other than the member from which the biometric information is acquired by the processor among the members, when the state specified by the processor indicates that uttering is not performed.

7. A non-transitory computer readable medium storing a program causing a computer to function as:
a processor configured to:
specify a position of each member of an assembly;
acquire biometric information from members of which the number is smaller than the number of all members;
specify, from the biometric information acquired by the processor, an activeness degree of the member from which the biometric information is acquired by the processor, and specify, from the activeness degree and the position specified by the processor, an activeness degree of a member other than the member from which the biometric information is acquired by the processor among the members; and
determine a state of the assembly from the activeness degree specified by the processor.

\* \* \* \* \*